(12) United States Patent  (10) Patent No.: US 8,149,982 B2
Wazybok et al.  (45) Date of Patent: Apr. 3, 2012

(54) CHANNEL SEATING TOOL FOR NUCLEAR FUEL ASSEMBLY AND METHOD FOR SEATING CHANNEL ON THE ASSEMBLY

(75) Inventors: David Francis Wazybok, Castle Hayne, NC (US); James Michael Downs, Wilmington, NC (US); David Grey Smith, Leland, NC (US); Edward G. Apple, Wilmington, NC (US)

(73) Assignee: Global Nuclear Fuel - Americas, LLC, Wilmington, NC (US)

( * ) Notice: Subject to any disclaimer, the term of this patent is extended or adjusted under 35 U.S.C. 154(b) by 0 days.

(21) Appl. No.: 12/960,847

(22) Filed: Dec. 6, 2010

(65) Prior Publication Data

US 2011/0103537 A1   May 5, 2011

Related U.S. Application Data

(62) Division of application No. 11/847,014, filed on Aug. 29, 2007, now Pat. No. 7,848,476.

(51) Int. Cl.
  *G21C 19/00* (2006.01)

(52) U.S. Cl. .................. 376/260; 376/261; 376/409

(58) Field of Classification Search .................. 376/260, 376/261, 409
  See application file for complete search history.

(56) References Cited

U.S. PATENT DOCUMENTS

| 2,114,779 | A |   | 4/1938 | Josey |
| 3,110,959 | A |   | 11/1963 | Blackstone |
| 3,193,469 | A | * | 7/1965 | Bradley et al. ................ 376/286 |
| 3,938,780 | A |   | 2/1976 | Hauptman |
| 5,775,673 | A |   | 7/1998 | Carnes et al. |
| 6,477,747 | B1 |   | 11/2002 | Flagg |

FOREIGN PATENT DOCUMENTS

CA   2126609   * 12/1995

* cited by examiner

*Primary Examiner* — Ricardo Palabrica
(74) *Attorney, Agent, or Firm* — Nixon & Vanderhye P.C.

(57) ABSTRACT

A tool to slide a channel on a nuclear reactor fuel bundle assembly, the tool includes: a plate having a slot to receive a handle of the fuel bundle and a lower surface that engages an upper edge of the channel; at least one post extends up from the plate, and an arm is attached to a pivot on the post and includes a first end to receive a downward force and a second end adapted to engage the handle of the fuel bundle to apply an upward force to the handle and push down on the channel.

18 Claims, 4 Drawing Sheets

CHANNEL SEATING TOOL FOR NUCLEAR FUEL ASSEMBLY AND METHOD FOR SEATING CHANNEL ON THE ASSEMBLY

This application is a divisional of application Ser. No. 11/847,014 filed Aug. 29, 2007 which is incorporated herein by reference.

BACKGROUND OF THE INVENTION

The present invention relates to channels that encase fuel bundles in the core of a boiling water nuclear reactor (BWR). The invention specifically relates to tools and method to slide a channel over a fuel bundle.

A fuel assembly for the core of a BWR typically includes an array of fuel rods held together by tie plates and spacers, and a channel that forms exterior sidewalls of the assembly. The channel may be embodied as a hollow tube having thin metallic walls and a rectangular cross-section.

The channel slides over an array of fuel rods, tie plates and spacers. The channel usually slides easily over the assembly until a lower edge of the channel reaches the finger springs of the lower tie plate. The finger springs are biased outward and engage the channel, after the channel is fully seated on the assembly of fuel rods, tie plates and spacers. Before the channel is fully seated, a substantial force is required to push the channel over the finger springs attached to the lower tie plate. To push the channel over the fingers springs, it is required to apply a downward force to the channel by, for example, two persons pushing on the upper edge of the channel or by positioning a wooden board on the upper edge of the channel and having two persons on opposite ends of the board push downward on the ends of the board. These conventional methods used to force a channel over an assembly may result in: (1) an injury to the persons pushing down on the channel, (2) an improperly seated channel, (3) debris falling into the fuel bundle assembly, or (4) damage to the fuel bundle assembly. There is a long felt need for a better method and tool for seating a channel on a fuel bundle assembly.

BRIEF DESCRIPTION OF THE INVENTION

A tool has been developed to slide a channel on a nuclear reactor fuel bundle, the tool includes: a cap plate having a slot to receive a handle of the fuel bundle and a lower surface adapted to engage an upper edge of the channel; at least one support post extending above the cap plate, and an arm attached to a pivot on the support post and having a first arm end for pushing down on the channel and a second arm end adapted to engage the handle of the fuel bundle.

The lower surface of the cap plate may be flat to seat on the upper edge of the channel and have a sidewall that fits around the channel upper edge. The flat portion of the plate may be seated on an entirety of a perimeter of the upper edge of the channel. The arm of the tool may be at least one straight lever arm pivotable about the pivot to engage a lower surface of the handle and thereby apply a downward force from the cap plate to the edge of the channel. The pivot may be a distance above the upper surface of the cap plate, which is shorter than a distance of the handle above an upper edge of the channel when the channel is fully seated on the fuel bundle. In addition, there may be a pair of posts and arms on opposite sides of the slot in the cap plate.

A tool has been developed to slide a channel on a nuclear reactor fuel bundle, said tool comprising: a cap plate having a lower surface with a seat to receive an upper edge of the channel, a upper surface opposite to the lower surface, and a slot to receive an upper handle of the fuel bundle; a pair of posts extending upward from the upper surface of the cap plate and on opposite sides of the slot, wherein each post has a pivot section above the upper surface of the cap plate; a pair of lever arms each pivotably attached to the pivot section of one of the posts, wherein each lever arm includes a first end section adapted to engage an upper handle on the fuel bundle assembly and a second end section adapted to receive a downward force to pivot the lever arm, wherein pivoting the lever arm applies a downward force on the cap plate and an upward force on the upper handle of the fuel bundle.

The lever arms of the tool may be aligned to be substantially perpendicular to the slot. The tips of the first end section of each of the lever arms may cross under the upper handle of the fuel bundle. The posts may each include an axle at the pivot section that extends through one of the lever arms. The slot may include an edge having a resilient covering to avoid damaging the upper handle. Further, the slot of the cap plate may be on a diagonal across the plate, and the posts are mounted in corner sections of the plate.

A method has been developed to slide a channel on a nuclear fuel bundle using a tool having a plate with a pair of pivoting lever arms attached to the plate, the method comprising: sliding the channel on the fuel bundle; applying the tool to the fuel bundle such that a lower surface of the plate abuts an upper edge of the channel; extending a handle of the fuel bundle through a slot in the plate; pivoting a lever arm mounted on a post extending up from the plate to engage the handle; applying a downward force on the lever to cause the lever arm to push upward against handle and for the plate to apply a downward force against the channel, and sliding the channel down over the fuel bundle by the application of the downward force against the channel.

The downward force may be manually applied to the lever arm to pivot a distal end of the lever arm, which engages the handle. The downward force may be applied to an entirety of a perimeter of the upper edge of the channel. A distal end of the lever arm may pivot from a position near the plate to a position in which the lever arm is substantially horizontal. Further, the tool may have a pair of lever arms that engage the handle from opposite sides of the handle.

DETAILED DESCRIPTION OF THE INVENTION

Figure 1:
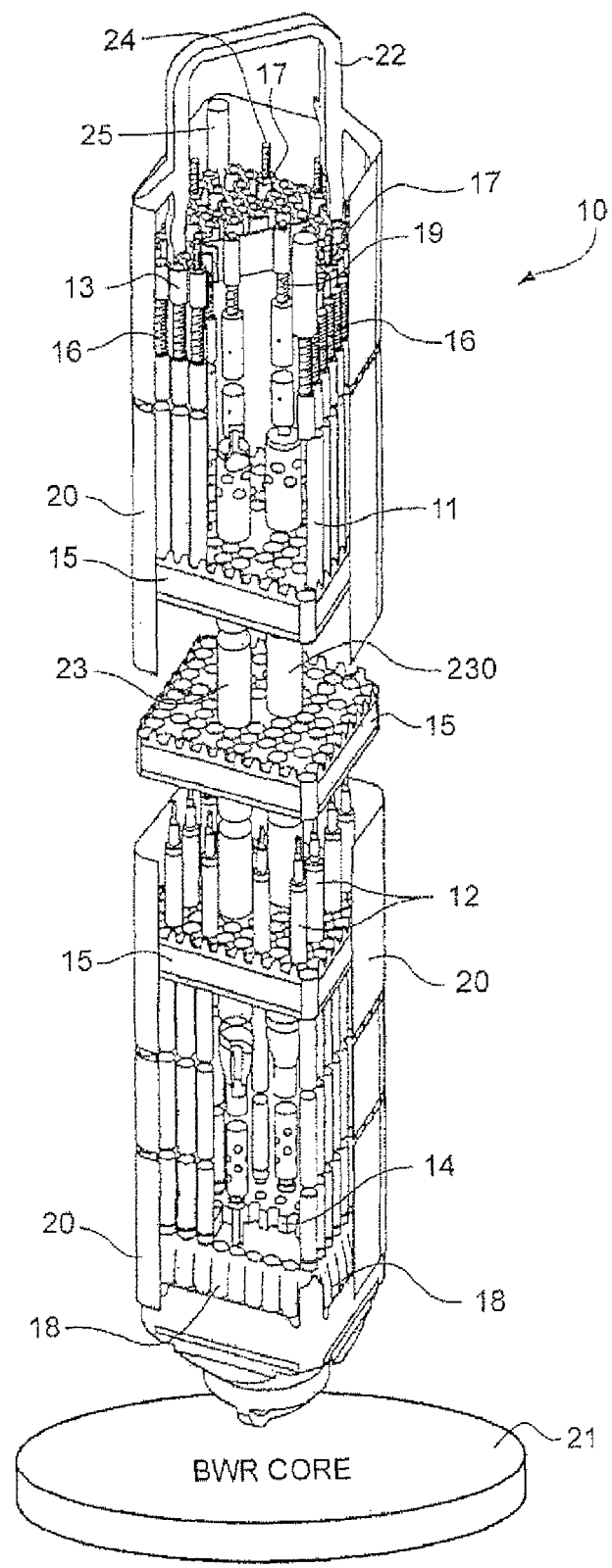
FIG. 1 is a side view showing in cross-section a conventional fuel bundle assembly.

FIG. 1 is a side view showing in cross-section a conventional fuel bundle assembly 10 shaped generally as a vertical column with a square cross-section. The assembly typically includes, for example, an array of full length fuel rods 11 and partial length fuel rods 12 arranged in parallel. The fuel rods 11, 12 are supported by an upper tie plate 13, a lower tie plate 14, and at least one fuel rod spacer 15 arranged at a location along the length of the fuel rods. Fuel rod expansion springs 16 extend from the upper end of the fuel rods to and through the upper tie plate 13. Hex nuts 17 attached to threaded upper ends 24 of tie rods are above the upper tie plate and secure the springs and fuel rods to the upper tie plate. The tie plates, especially the lower tie plate, may include finger springs 18 on the outer sidewalls of the tie plate that engage a channel 20 that forms sidewalls for the fuel bundle assembly. The channel 20 is typically an elongated hollow tube, rectangular in cross-section, and having a length to cover the fuel bundle. Tabbed water rods 23 and non-tabbed water rods 230 extend through the bundle assembly 10 parallel to the fuel rods, are secured to the lower tie plate, and to upper end plugs 19 that seat in the upper tie plate.

A generally U-shaped upper tie plate handle 22 is attached to the upper tie plate. The handle may be used to raise and lower the fuel bundle assembly into a reactor core 21. Channel fastener posts 25 extend up from the corners of the upper tie plate and serve as guides for the channel sliding over the fuel bundle.

Figure 2:
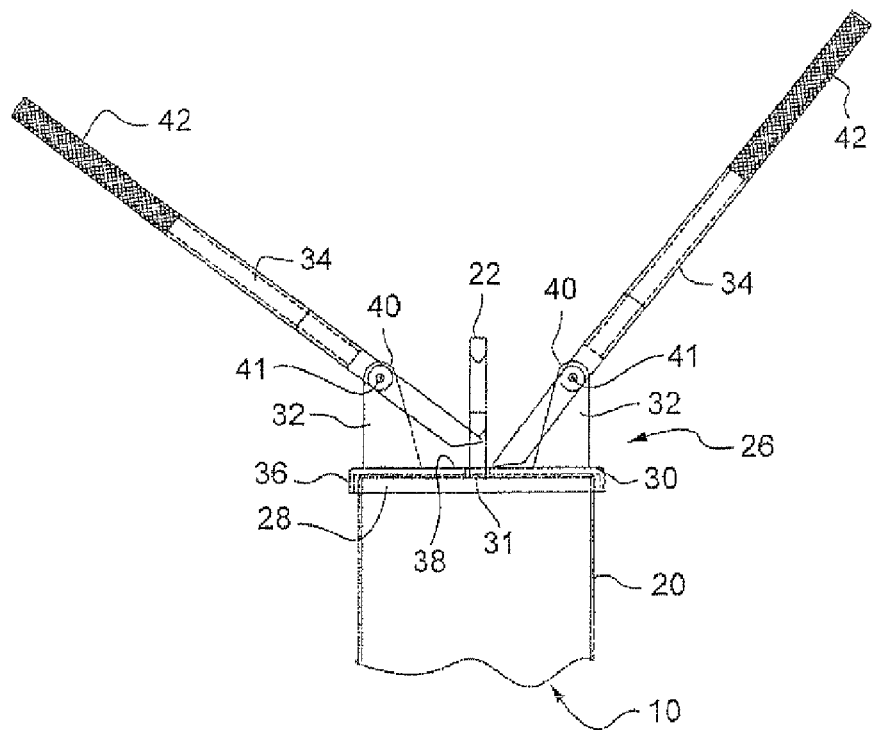
FIG. 2 is a side view of an upper section of the fuel rod bundle with a channel being slid over the bundle by a channel insertion tool, wherein the arms of the tool are in a first position.
Figure 3:
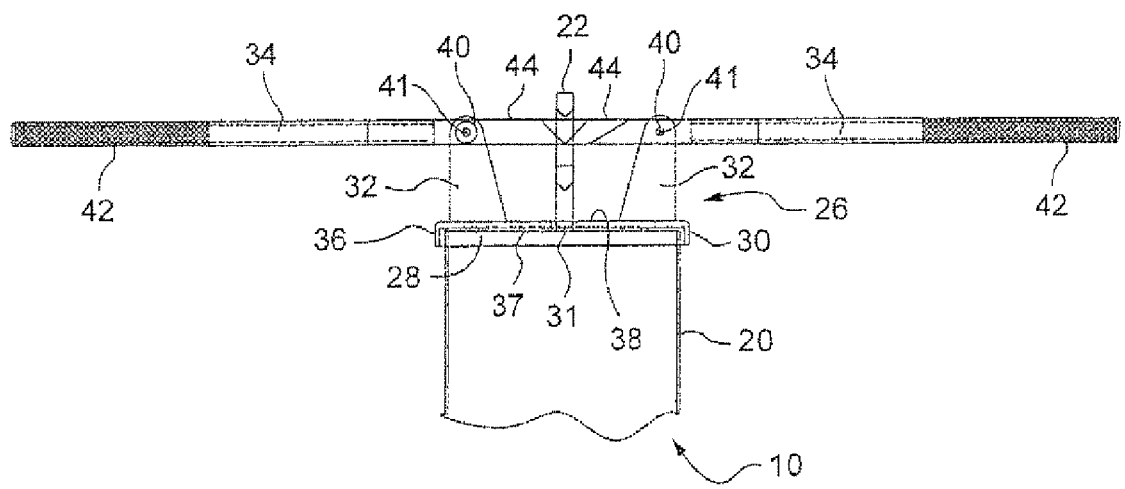
FIG. 3 is a side view of an upper section of the fuel rod bundle with a channel being slid over the bundle by a channel insertion tool, wherein the arms of the tool are in a second position applying an upward force on the handle of the fuel bundle assembly.
Figure 4:
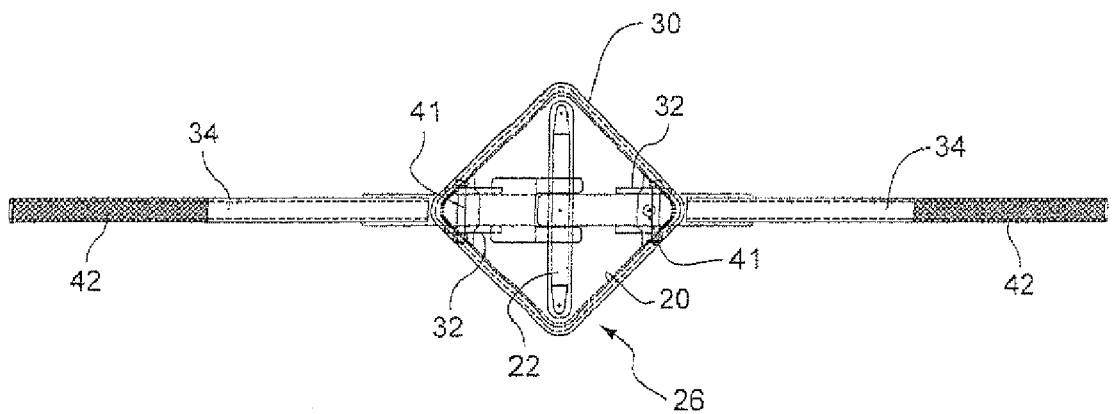
FIG. 4 is a top view of the channel insertion tool applied to the fuel bundle assembly.

FIGS. 2 and 3 are side views of an upper section of a channel insertion tool 26 applied to a channel 20 being slid over a fuel bundle assembly 10. FIG. 4 is a top down view of the channel insertion tool 26 applied to a channel. The tool 26 applies a downward force to the upper edge 28 of the channel 20 to slide the channel fully on the fuel bundle and thereby seat the channel on the fuel bundle. The channel insertion tool includes a cap plate 30, a pair of posts 32 and lever arms 34 each attached to one of the posts 32. The plate has a generally flat lower surface 37 that seats on the entire perimeter of the upper edge 28 of the channel 20 and a locating lip 36, e.g., sidewall, extending around the perimeter of the channel 20 when the cap plate 30 is seated on the channel 20.

The support posts 32 extend upward from an upper surface 38 of the cap plate. Each post 32 has an upper end that forms a pivot point 40 for one of the lever arms 34. A rectangular slot 31 in the cap plate allows the cap plate to slide over the upper tie plate handle 22. The posts 32 are each on an opposite side of the slot 31. The pivot point 40 may be a distance above the cap plate 30 that is the same as or shorter than a distance between the upper tie plate 13 and upper handle 22.

Sliding the channel 20 over the fuel bundle assembly 10 is one of the final steps of fabricating the assembly. Prior to sliding the channel, the fuel rods are mounted on the tie plates and inserted in the spacers to form a fuel bundle. The channel is positioned directly over the fuel bundle. The positioned channel may be lowered down onto bundle or the bundle may be raised into the channel. The channel typically slides freely onto the bundle until the channel engages the finger springs 18 on or near the lower tie plate 14. The upper edge 28 of the channel generally slides past the upper portion of the handle 22 of the upper tie plate 13 before the bottom edge of the channel abuts against the finger springs 18 on the lower tie plate 14.

The force required to overcome the bias of the finger springs 18 is substantially greater than the force required to slide the channel 20 over the fuel bundle before the channel abuts the finger springs 18. To overcome the bias of the finger springs 18, a downward force is applied to the top of the channel 20 preferably in a direction parallel with the axis of the fuel bundle assembly 10. The force is applied using the channel tool 26 that is positioned on top of the channel 20 after the channel has slid partially on the fuel bundle.

When the channel 20 is near or abuts the finger springs 18 associated with the lower tie plate 14, the channel insertion tool 26 is mounted on top of the channel and applies a downward force on the channel in a direction parallel to the axis of the fuel bundle assembly 10. The channel insertion tool 26 preferably distributes the force equally to the entire perimeter of the upper edge 28 of the channel 20. To achieve equal force distribution, the cap plate 30 of the channel insertion tool 26 includes a lower surface 37 that is shaped to seat on the upper edge 28 of the channel. Preferably, the lower surface 37 of the cap plate 30 seats on the entire perimeter of the upper edge 28 of the channel.

To position the channel tool 26 on the channel 20 and fuel bundle, the slot 31 in the cap plate 30 is aligned over the upper tie plate 13 handle 22. The slot 31 may be oriented and shaped to receive the handle 22. For example, the slot 31 may be substantially rectangular and arranged on a diagonal across the generally square shaped plate. The edges of the slot 31 may be covered with a plastic coating that is a resilient cover that does not scratch or otherwise harm the metal surfaces of the handle 22. The cap plate 30 slides over the handle 22 and rests on the upper edge 28 of the channel 20.

Figure 5:
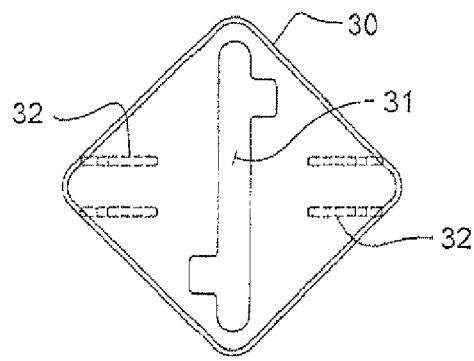
FIG. 5 is a top view of a cap plate of the channel insertion tool.
Figure 6:
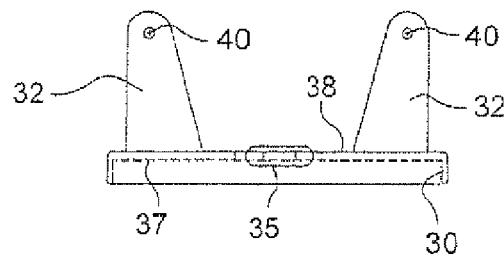
FIG. 6 is a side view of the cap plate of the channel insertion tool.

FIG. 5 is a top down view of the cap plate 30 of the channel insertion tool 26. FIG. 6 is a side view of the cap plate 30. The lower surface 37 of the plate may be a relatively flat and have an outer surface shaped to seat on the upper edge 28 of the channel 20. A sidewall locating lip 36 on the cap plate 30 may extend around the perimeter of the channel wall and form a means for maintaining alignment of the cap plate 30 on the channel 20. The lower surface 37 of the cap plate 30 and inside surface of the locating lip 36 may be coated with a plastic layer 35 or other resilient material to avoid scratching the channel and to provide good seating between the cap plate 30 and channel 20.

Figure 8:
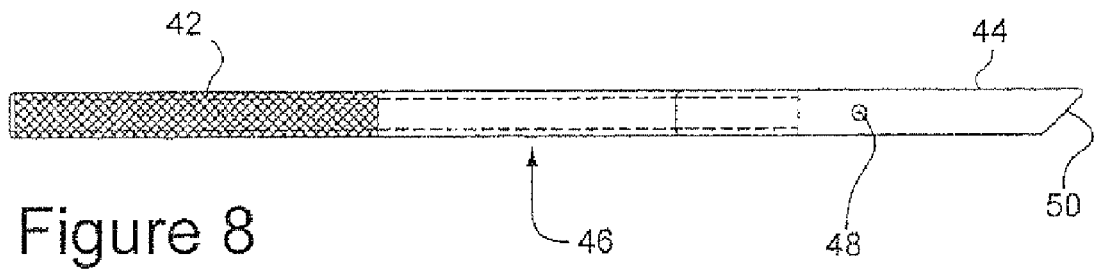
Figure 9:
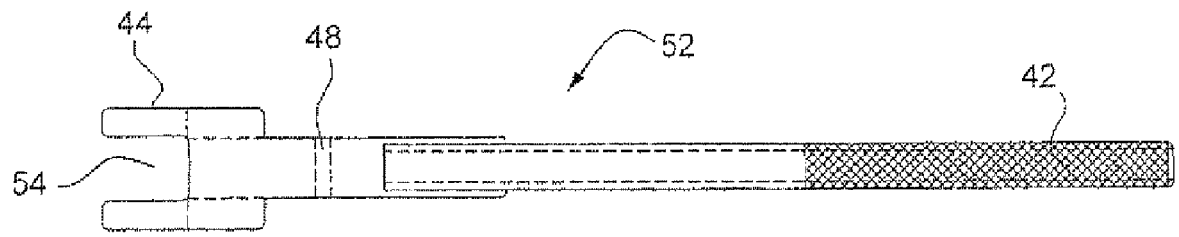
FIGS. 9 and 10 are top and side views, respectively, of a second lever arm of the channel insertion tool.

As shown in FIG. 2, the lever arms 34 are pivoted to avoid the handle 22 as the cap plate 30 slides over the channel 20 and the lower surface 37 of the cap plate seats on the upper edge 28 of the channel 20. The lever arms 34 may each include a handle end 42 and a tip end 44, shown in FIG. 3. The lever arms 34 are each attached to a respective one of the pivot points 40 on each support post 32. As shown in FIGS. 4, 8 and 9, a pivot pin 41 extends through a pivot hole 48 in a lever arm 34 and an opening in the distal end of a support post 32. The pivot pin 41, pivot hole 48 in the lever arm 34 and opening the support post 32 may form the pivot point 40 about which each of the lever arms 34 pivot. The support post 32 may include a pair of legs as is shown in FIG. 5.

The tip end 44 of each of the lever arms 34 pivots about an arc extending from the upper surface 38 of the cap plate 30 to at least a horizontal position as shown in FIG. 3. While the lever arms 34 are pivoted such that the arm handles 42 extend upward, the tips 44 point downward and are separated. The handle 22 of the upper tie plate may pass between the separated tips. As the lever arms 34 are pivoted such that the arm handles 42 move down, the tips 44 of the arms move up and engage the handle 22 of the upper tie plate 13. Preferably, the lever arms 34 are pivoted symmetrically such that the tips 44 remain at the same elevation as they rise to engage the handle 22 of the upper tie plate 13. The lever arms may be pivoted by manual force. For example, a single individual may used his two hands to each grasp one arm handle 42 and press the handles downward in a uniform motion to raise together the tips 44.

As the tips 44 of the lever arms 34 engage the handle 22 of the upper tie plate 13, the downward force applied to the arm handles 42 and the resulting upward force applied by the tips 44 on the upper tie plate handle 22 apply a downward force through the support posts 32 and to the cap plate 30. The downward force on the cap plate 30 is transferred to the upper edge 28 of the channel 20. The downward force applied to the cap plate 30 and upper edge 28 of the channel 20 is preferably in a direction parallel to the axis of the fuel bundle assembly 10 and channel 20.

A force applied parallel to the axis of the fuel bundle and channel is facilitated by ensuring that the flat lower surface 37 of the cap plate 30 engages the entire perimeter of the upper edge 28 of the channel 20 and that the tips 44 of both lever arms 34 pivot upward in unison.

The downward force applied to the channel 20 causes the channel 20 to slide down with respect to the fuel bundle assembly 10. By pressing down on the arm handles 42, a single person can manually apply sufficient force to cause the channel 20 to fully seat on the fuel assembly 10 and overcome the force of the spring fingers 18 on the lower tie plate 14. A fully seated channel 20 on the fuel assembly 10 is shown in FIG. 3. Once the channel 20 is fully seated, the channel insertion tool 26 may be removed by pivoting the lever arms 34 upward (as shown in FIG. 2) and sliding the cap plate 30 up and off the channel 20 and handle 22 of the upper tie plate 13.

Figure 7:
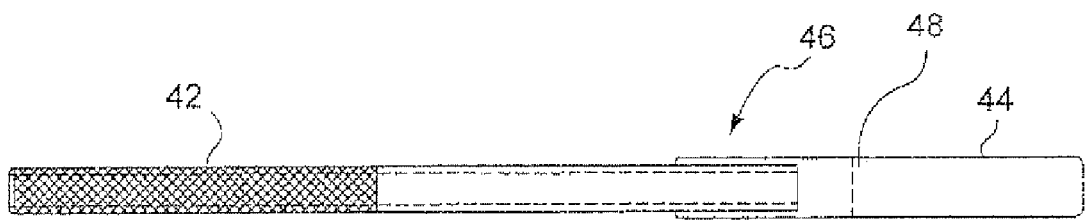
FIGS. 7 and 8 are top and side views, respectively, of a first lever arm of the channel insertion tool.

FIGS. 7 and 8 show a top and side view, respectively, of a first lever arm 46, with a center portion of the arms shown in cross-section. The arms may be formed of a metallic hollow rod that may be rectangular or cylindrical in cross-section. The arm handle 42 may be coated with a deformable plastic material or a sheath to provide a grip for a hand of the person sliding the channel over the fuel bundle. A pivot hole 48 through the arm handle receives an pivot pin 41 (FIG. 4) that engages the support post 32 on the cap plate 30. The length of the arm handle 42 portion of the lever arm may be greater than the length of the tip 44 portion of the arm. For example, the arm handle portion may be two to three times the length of the tip portion of the lever arm. The tip 44 of the lever arm 46 may be a straight rod having a tapered end 50.

Figure 10:
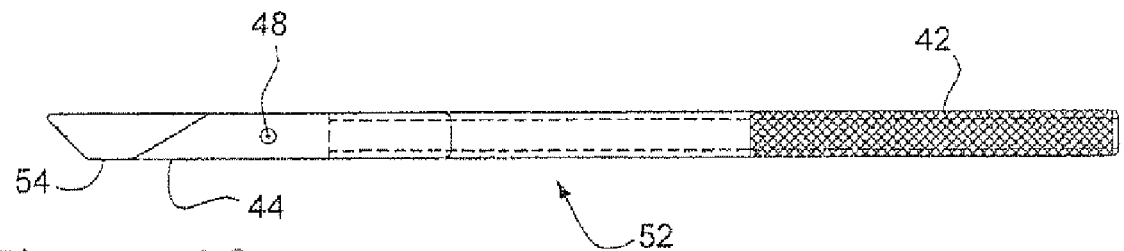

FIGS. 9 and 10 show a top and side view, respectively, of a second lever arm 52, with a center portion of the arms shown in cross-section. The second lever arm 52 is similar in shape and size to the first lever arm 46, except with respect to the structure of the tip 44. The second lever arm 52 includes a two-pronged claw 54. The prongs of the claw 54 are separated to receive the tapered end 50 of the first lever arm 46.

The first and second lever arms 46, 52 (collectively referred to as lever arms 34 in FIGS. 2 and 3) are mounted on opposite support posts 32 of the cap plate 30. As the lever arms 34 pivot, the clawed tip 54 and the tapered end tip 50 both engage the handle 22 of the upper tie plate 13. In particular, the tapered end tip 50 moves between the two prongs of the claw 54 such that the tip 50 and prongs of claw 54 all engage a lower surface of the handle 22 of the upper tie plate 13. Further, the relative positions of the claw 54 and tip 50 ensure that the lever arms 34 are aligned in a common plane and thereby promote application of a uniform force that is downward and parallel to the axis of the fuel bundle assembly 10.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to slide a channel on a nuclear fuel bundle using a tool having a plate with a pair of pivoting lever arms attached to the plate, wherein the plate includes a slot and respective post to support each of the lever arms, the method comprising:

sliding the channel on the fuel bundle such that the channel slides to an intermediate position on the fuel bundle;

applying the tool to the fuel bundle such that a lower surface of the plate abuts an upper edge of the channel;

extending a handle of the fuel rod bundle through a slot in the plate;

pivoting the lever arms, wherein the lever arms are each mounted on a respective post mounted to the plate and the pivoting of each of the lever arms causes each of the arms to engage the handle;

applying a downward force on the lever to cause the lever arm to push upward against handle and for the plate to apply a downward force against the channel, and sliding the channel further down the fuel rod bundle to a final position on the fuel bundle by the application of the downward force against the channel.

2. The method in claim 1 wherein the downward force applied to each of the lever arms pivots a distal end of each of the lever arms which engages the handle.

3. The method in claim 1 wherein the downward force applied to each of the lever arms is applied manually.

4. The method in claim 1 wherein the downward force is applied to an entirety of the upper edge of the channel.

5. The method in claim 1 wherein a distal end of each of the lever arms pivots from a position near the plate up to a position in which the lever arm is at least substantially horizontal.

6. The method in claim 1 wherein the lever arms engage the handle from opposite sides of the handle.

7. A method to slide and seat a channel on a nuclear reactor fuel bundle using a tool including a cap plate, support posts extending above the cap plate and an arm attached to a pivot on each support post, the method comprising:

sliding the channel on the nuclear fuel bundle, such that the channel slides to an intermediate position on the fuel bundle;

placing a lower surface of the a cap plate on an upper edge of the channel, such that a handle on the fuel bundle extends through a slot in the cap plate;

positioning a first end of each arm under a surface of the handle;

pushing down on a second end of each arm to cause the cap plate to apply a downward force on the channel and thereby further slide the channel on the nuclear fuel bundle to a final position on the nuclear fuel bundle.

8. The method of claim 7 wherein the downward force is applied uniformly to an upper edge of the channel.

9. The method of claim 7 wherein the lower surface of the cap plate includes a substantially flat portion and a sidewall and the placement of the cap plate includes positioning the substantially flat portion against the upper edge of the channel and positioning the sidewall outward of the upper edge of the channel.

10. The method of claim 9 the flat portion seats on an entirety of the upper edge of the channel.

11. The method as in claim 7 wherein pushing down on the second end, pivots the arm about the pivot and moves the first end upwards.

12. The method of claim 11 wherein the pivot may be a distance above the upper surface of the cap plate, which distance is shorter than a distance of the handle above an upper edge of the channel when the channel is fully seated on the fuel bundle.

13. The method of claim 7 wherein the arms are substantially perpendicular to the slot while the cap plate is on the upper edge of the channel.

14. The method of claim 7 wherein the first end of each of the arms cross when under the handle of the fuel bundle.

15. The method of claim 7 further comprising applying a resilient material border surrounding the slot and said resilient material border engages the handle when the cap plate slides over the handle.

16. The method of claim 7 further comprising applying a resilient material on a lower surface of the cap plate, and the resilient material engages the upper edge of the channel.

17. The method of claim 1 wherein the intermediate position corresponds to a lower edge of the channel being aligned with finger springs on a lower tie plate of the fuel bundle and the step of sliding the channel further down to the final position includes sliding the lower edge over the finger springs.

18. The method of claim 7 wherein the intermediate position corresponds to a lower edge of the channel being aligned with finger springs on a lower tie plate of the fuel bundle and the step of sliding the channel further down to the final position includes sliding the lower edge over the finger springs.

* * * * *

UNITED STATES PATENT AND TRADEMARK OFFICE
CERTIFICATE OF CORRECTION

| | |
|---|---|
| PATENT NO. | : 8,149,982 B2 |
| APPLICATION NO. | : 12/960847 |
| DATED | : April 3, 2012 |
| INVENTOR(S) | : David Wazybok et al. |

It is certified that error appears in the above-identified patent and that said Letters Patent is hereby corrected as shown below:

At column 4, line 5, delete "on top of the channel and" and insert --on top of the channel 20 and--

At column 4, line 21, delete "a plastic coating" and insert --a plastic coating 35--

In the Claims:

In Claim 1 at column 6, lines 1-2, delete "a slot and respective post" and insert --a slot and a respective post--

Signed and Sealed this
Tenth Day of July, 2012

David J. Kappos
*Director of the United States Patent and Trademark Office*